United States Patent [19]
Kasai et al.

[11] Patent Number: 5,092,813
[45] Date of Patent: Mar. 3, 1992

[54] APPARATUS FOR MANUFACTURING SAUSAGES OR THE LIKE

[75] Inventors: Minoru Kasai, Ebina; Minoru Nakamura, Tokyo, both of Japan

[73] Assignee: Hitec Co., Ltd., Tokyo, Japan

[21] Appl. No.: 515,175

[22] Filed: Apr. 26, 1990

[30] Foreign Application Priority Data

Apr. 28, 1989 [JP] Japan .................. 1-110050

[51] Int. Cl.⁵ .................................. A22C 11/00
[52] U.S. Cl. ........................ 452/46; 452/47; 452/51
[58] Field of Search ............... 452/46, 47, 48, 51, 452/32, 30

[56] References Cited

U.S. PATENT DOCUMENTS

| | | | |
|---|---|---|---|
| 3,694,853 | 10/1972 | Greider | 452/47 |
| 3,964,128 | 6/1976 | Townsend et al. | 452/47 |
| 4,112,546 | 9/1978 | Müller | 452/47 |
| 4,129,923 | 12/1988 | Hoegger | 452/46 |
| 4,539,796 | 9/1985 | Nakamura et al. | 452/51 |

Primary Examiner—Willis Little
Attorney, Agent, or Firm—Wegner, Cantor, Mueller & Player

[57] ABSTRACT

Disclosed is an apparatus for manufacturing sausages or the like including: a nozzle for stuffing a material such as a meat emulsion into a casing for sausages or the like; a pump for supplying the material into the nozzle; a chuck for rotating the casing stuffed by the nozzle, and a linking device for clamping the stuffed casing discharged from the chuck and forming the casing stuffed with the material into the form of a chain in cooperation with the chuck. A motor for driving the pump, a motor for driving the chuck, and a motor for driving the linking device are provided separately and independently of each other, and the respective numbers of revolutions of the pump, the chuck, and the linking device rotatively driven by the respective motors are individually changeable.

6 Claims, 12 Drawing Sheets

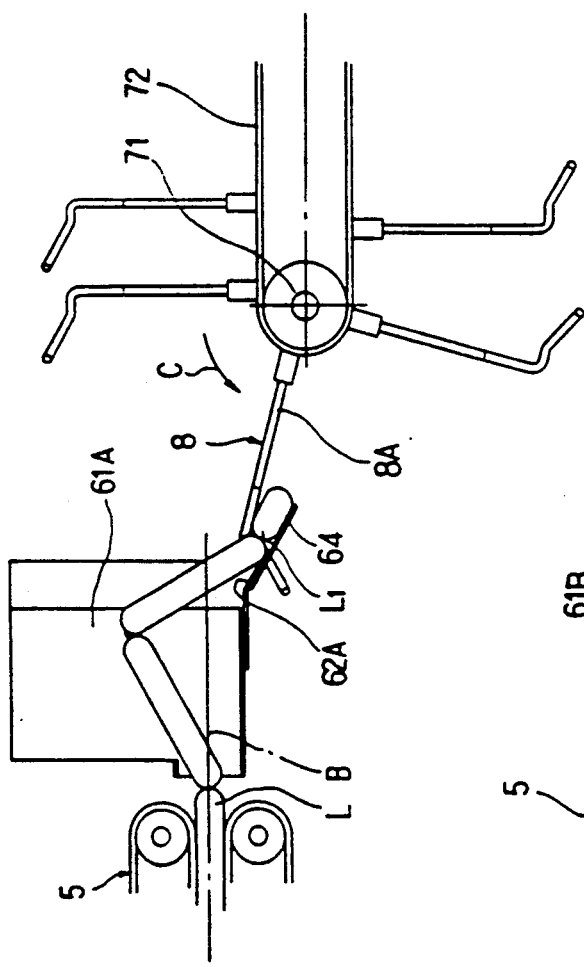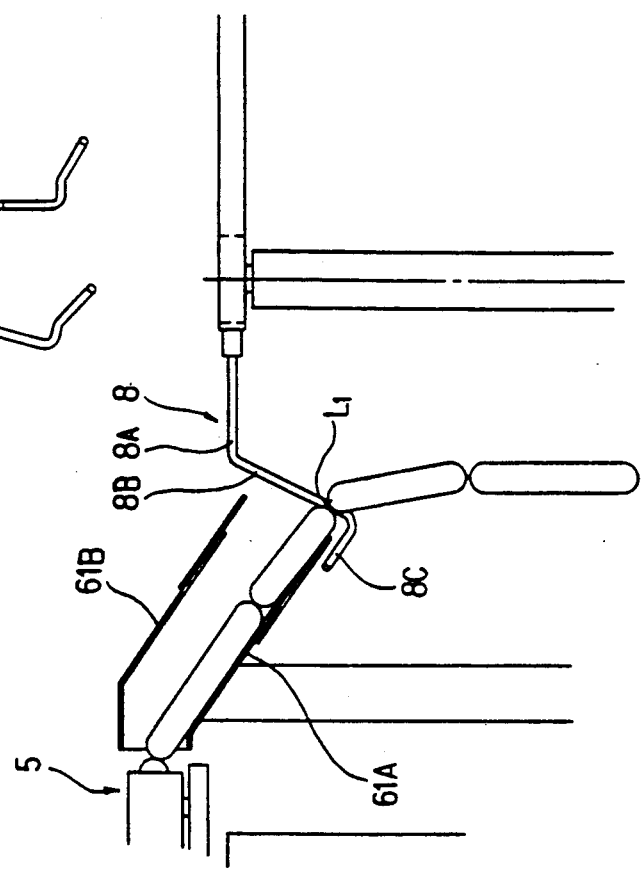

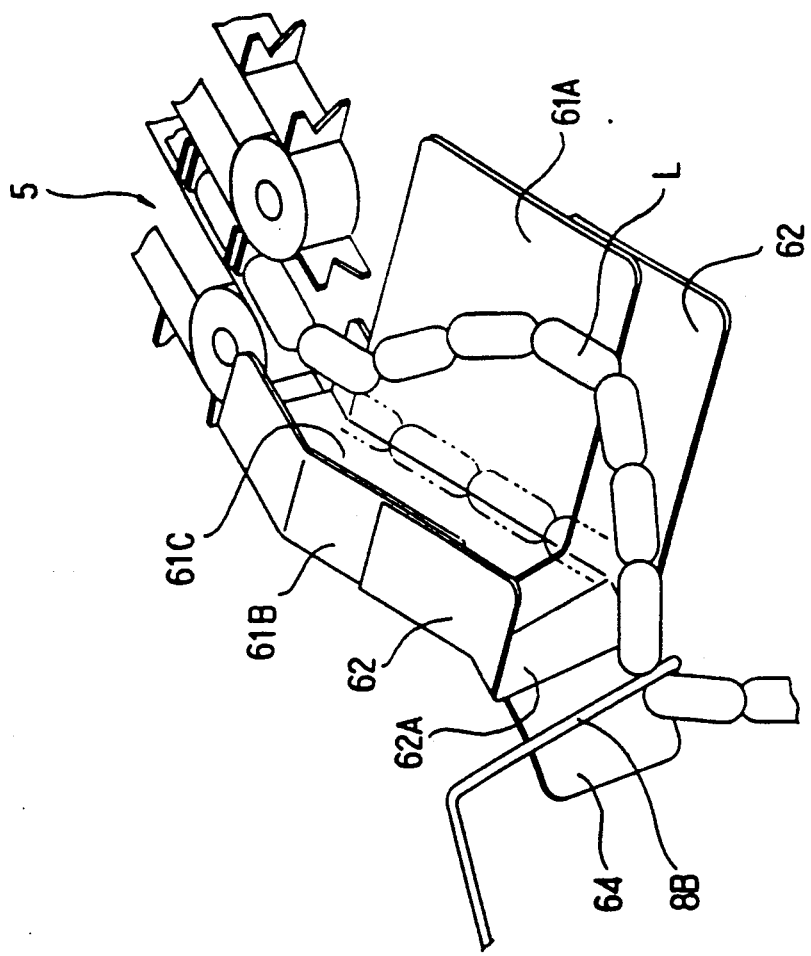

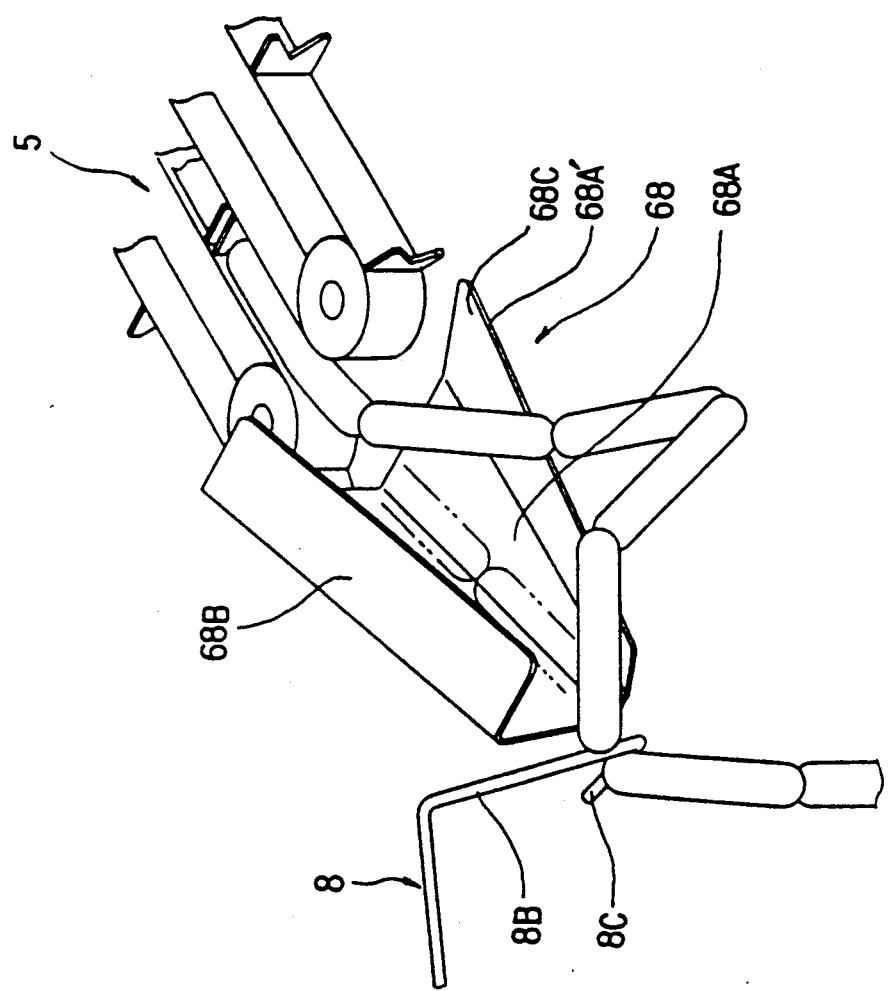

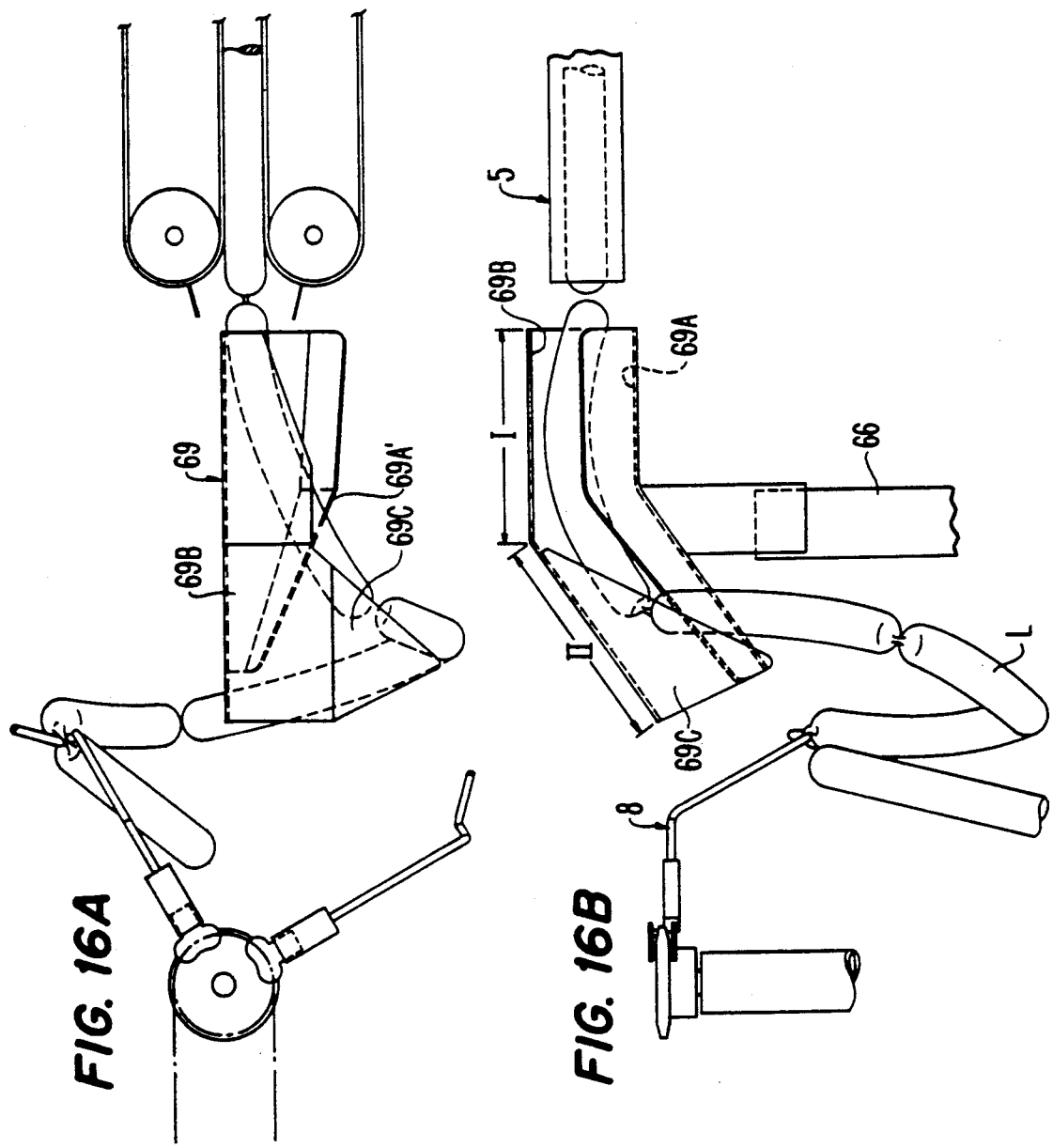

APPARATUS FOR MANUFACTURING SAUSAGES OR THE LIKE

BACKGROUND OF THE INVENTION

1. Field of the Invention

The present invention relates to an apparatus for manufacturing sausages or the like, and more particularly to an apparatus for manufacturing sausages or the like which can be used irrespective of the size of sausages or the like to be produced, has a simplified transmission mechanism, and facilitates maintenance.

2. Description of the Related Art

Hitherto, apparatus for manufacturing sausages or the like (e.g., Wieners) have been known in which a material such as a meat emulsion is discharged from a nozzle and is filled into a casing, the casing is held by a chuck and rotated, the casing filled with the material is thereby twisted to link the individual portions filled with the material into the form of a chain, and the chain of linked products are suspended sequentially in the form of loops. (Refer to Japanese Patent Publication Nos. 5899/1966 (U.S. Pat. No. 3,191,222) and 13329/1989 (U.S. Pat. No. 4,539,796).

With the conventionally known apparatus for manufacturing sausages or the like, although the feeding speed of a linking device determines the speed of the overall apparatus, the feeding speed of the linking device is determined by the strength and rigidity of the casing, the capacity of removing the products suspended in the form of loops, the capability of processing by heat treatment facilities which is conducted as a following process, or other factors. Hence, the feeding speed of the linking device required is not uniform.

In addition, the number of revolutions of the chuck for twisting the casing is determined by the length of a product produced (i.e., the length of individual sausages, hereinafter referred to as the length of one link). That is, while the linking device advances the length of one link while holding the stuffed casing, the chuck must rotate by a portion of necessary twists. For this reason, the number of revolutions of the chuck must be altered in response to the change in the product length. Furthermore, the rate of slippage occurring between the product and the chuck holding the casing and rotating to give twists to it differs depending on the outside diameter of the product, the rigidity of the casing, the hardness of the material, and others. This also causes the number of revolutions of the chuck to vary. Consequently, the number of revolutions required for the chuck is not uniform.

In the apparatus for manufacturing sausages or the like disclosed in Japanese Patent Publication No. 5899/1966, (U.S. Pat. No. 3,191,222) a pump for discharging the material is constituted by a gear pump. In this known technique, a change in the amount of discharge by the pump is effected by replacing the gear, so that the change in the amount of pump discharge is not continuous and takes place in steps. Consequently, it has been difficult to accurately obtain an amount of discharge commensurate with the operational state of the apparatus. This means that the apparatus can be operated at a lower operating speed than a necessary operating speed, which has not been favorable in terms of the increased productivity of the apparatus.

In the apparatus for manufacturing sausages or the like disclosed in Japanese Patent Publication No. 13329/1989 (U.S. Pat. No. 4,539,796), the above-described drawback is overcome, but the problem of the change in the number of revolutions of the chuck has not yet been solved. Namely, with the apparatus for manufacturing sausages or the like disclosed in Japanese Patent Publication No. 5899/1966 (U.S. Pat. No. 3,191,222), the number of revolutions of the chuck is altered by replacing a pair of gears incorporated in a hermetically sealed gear housing. In addition, with apparatus for manufacturing sausages or the like disclosed in Japanese Patent Publication No. 13329/1989 (U.S. Pat. No. 4,539,796), the number of revolutions is altered by replacing either one of a pair of sprockets.

Accordingly, the change in the number of revolutions of the chuck in the prior art is effected in steps. Moreover, since the number of steps is small in the light of the number of replacement parts, it is necessary to rotate the chuck with a number of revolutions more than an appropriate number of revolutions. Consequently, a greater number of twists than is required for the product is imparted to the product. In addition, with the apparatus disclosed in Japanese Patent Publication No. 5899/1966 (U.S. Pat. No. 3,191,222), in order to replace the pair of gears, the operation of disassembling the hermetically closed gear housing and reassembling the gears housing after the gear replacement is required. This disassembling and reassembling operation for the gear replacement cannot be conducted in practice since it involves a high degree of trained skill and a long period of work required for the operation. In addition, lubricating oil is filled in the gear housing, and since the peripheral portions are contaminated with this lubricating oil, it takes time in cleaning them, and it can therefore be said that this is an operation which needs to be avoided by all means as a foodstuff processing machine.

Furthermore, with the apparatus for manufacturing sausages or the like disclosed in Japanese Patent Publication No. 5899/1966, the pump, the chuck, and the linking device are driven by a single motor. Meanwhile, with the apparatus for manufacturing sausages or the like disclosed in Japanese Patent Publication No. 13329/1989 (U.S. Pat. No. 3,191,222), these components are either driven by a single motor in the same way as described above, or the pump is driven by one of two motors, while the chuck and the linking device are driven by the other motor. Consequently, the motor on the one hand, and the pump, the chuck, and the linking device on the other, must be linked by an intricate transmission mechanism, so that difficulties have been experienced in parts replacement during maintenance and an inspection operation.

Loopers used in the apparatus for manufacturing sausages or the like disclosed in the aforementioned Japanese Patent Publication Nos. 5899/1966 (U.S. Pat. No. 4,539,796) and 13329/1989 (U.S. Pat. No. 4,539,796) undergo rotational movement or swinging movement to the left or right. Such motion of the loopers make it difficult for the sausages or the like to pass through the interior of loopers, giving rise to the trouble of the sausages or the like becoming clogged inside them. Furthermore, complicated mechanisms have been required for moving the loopers.

SUMMARY OF THE INVENTION

Accordingly, an object of the present invention is to provide an apparatus for manufacturing sausages or the like which is capable of obtaining desired productivity irrespective of the size of a product (an outside diameter and the length of one link) by rendering the respective numbers of revolutions of a pump, a linking device, and a chuck continuously changeable separately.

Another object of the present invention is to provide an apparatus for manufacturing sausages or the like which is capable of reducing the amount of casings wasted and enhancing the economic efficiency by reducing the number of twists of a linked portion of a product to a necessary minimum.

Still another object of the present invention is to provide an apparatus for manufacturing sausages or the like which facilitates an operation of changing the size of a product.

A further object of the present invention is to provide an apparatus for manufacturing sausages or the like which facilitates maintenance by separately driving each component part and forming the parts into units, and in which the number of parts subject to maintenance and portions subject to maintenance are reduced.

A still further object of the present invention is to provide an apparatus for manufacturing sausages or the like which is capable of forming stable loops by the use of a fixed-type looper that does not move at all, and in which the number of parts subject to maintenance and portions subject to maintenance are reduced by simplifying the arrangement.

A further object of the present invention is to provide an apparatus for manufacturing sausages or the like and forming loops which has a simplified arrangement and is manufactured at low-cost.

To these ends, in accordance with the present invention, there is provided an apparatus for manufacturing sausages or the like comprising: a nozzle for stuffing a material such as a meat emulsion into a casing for sausages or the like; a pump for supplying the material into the nozzle; a chuck for rotating the casing stuffed with the material by the nozzle; and a linking device for clamping the stuffed casing discharged from the chuck and forming the casing stuffed with the material into the form of a chain in cooperation with the chuck, wherein a motor for driving the pump, a motor for driving the chuck, and a motor for driving the linking device are provided separately and independently of each other, and the respective numbers of revolutions of the pump, the chuck, and the linking device driven by the respective motors are individually changeable.

In accordance with another aspect of the invention, in addition to the aforementioned arrangement in which a motor for driving the pump, a motor for driving the chuck, and a motor for driving the linking device are provided separately and independently of each other, and the respective numbers of revolutions of the pump, the chuck, and the linking device driven by the respective motors are individually changeable, the apparatus for manufacturing sausages or the like further includes an arrangement in which a looper is disposed between the linking device and the loop conveyor and is adapted to receive a chain of linked products, the loop conveyor having hooks moving in a plane including a horizontal component, and the looper having a space for rendering a form of passage of the chain of linked products in the looper changeable in such a manner that the chain of linked products is retained by one of said hooks of said loop conveyor.

The above and other objects, features and advantages of the present invention will become more apparent from the following detailed description of the invention when read in conjunction with the accompanying drawings.

BRIEF DESCRIPTION OF THE DRAWINGS

FIGS. 11 and 12 are a top plan view and a front elevational view illustrating the flow of the chain of products in the looper, respectively;

FIG. 13 is a perspective view taken in the direction of X in FIG. 9B;

FIG. 14 is a perspective view illustrating still another embodiment of the looper;

FIGS. 16A and 16B are a top plan view and a front elevational view of a looper having a further configuration, respectively.

DESCRIPTION OF THE PREFERRED EMBODIMENTS

Referring now to the accompanying drawings, a description will be given of the preferred embodiments of the present invention.

Figure 1:
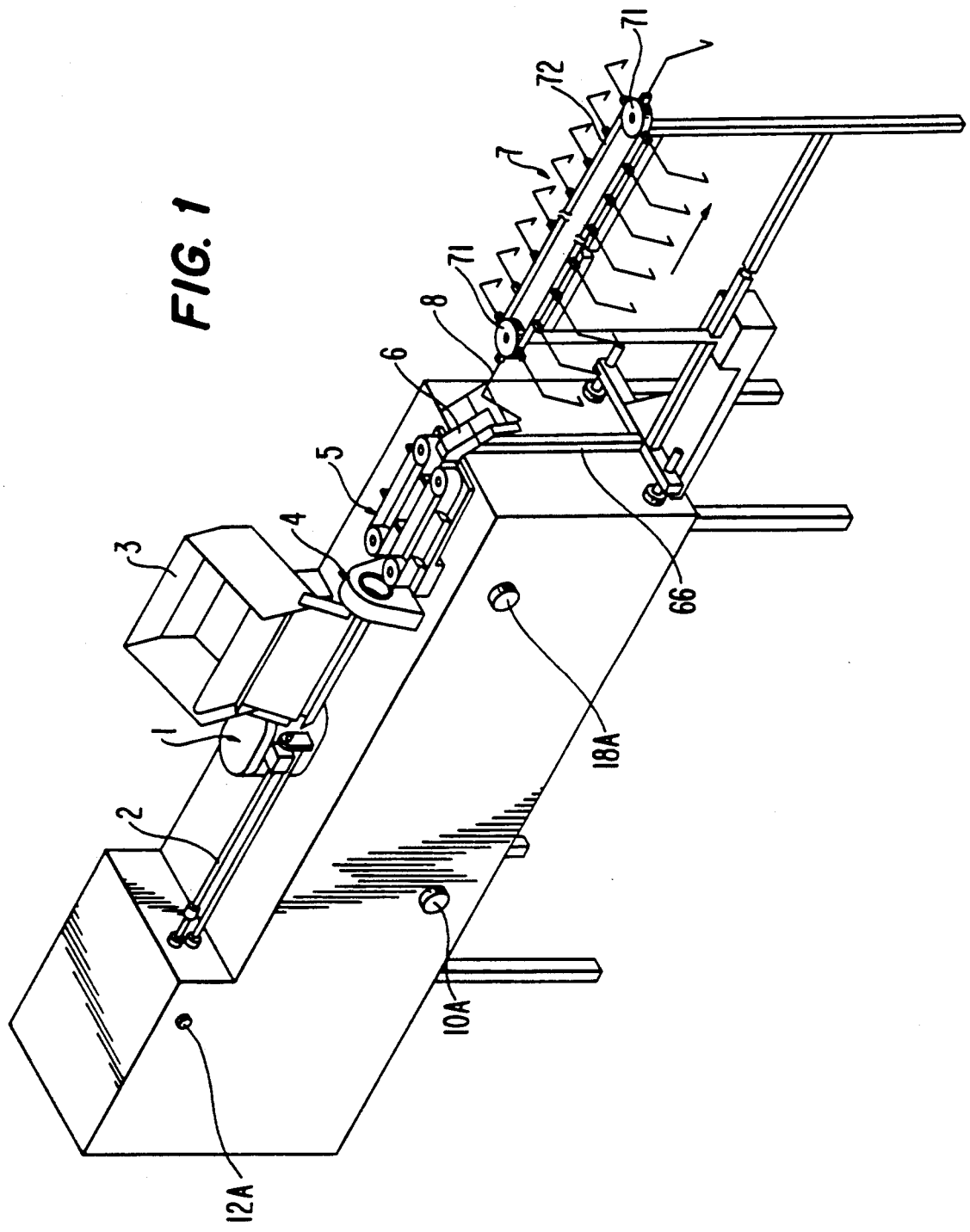
FIG. 1 is an overall perspective view of an apparatus for manufacturing sausages or the like in accordance with an embodiment of the present invention.
Figure 2:
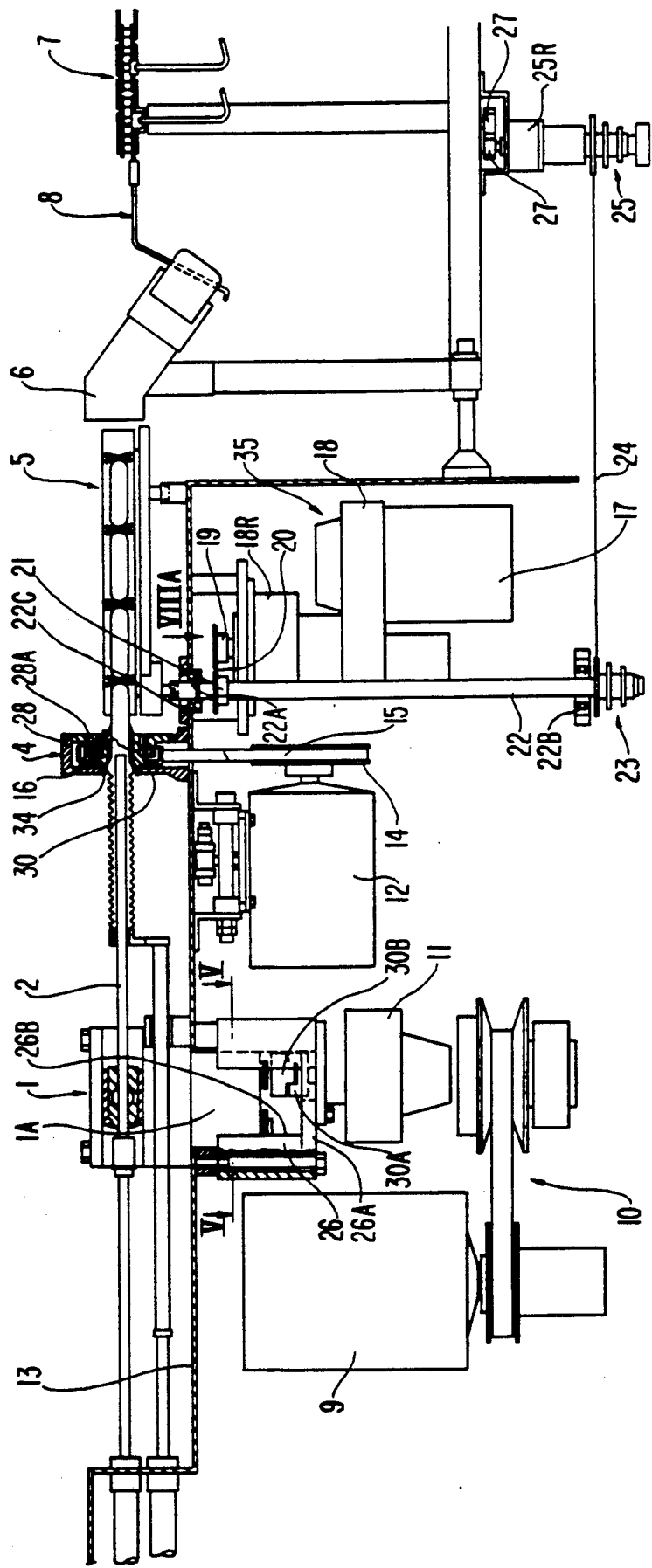
FIG. 2 is a schematic cross-sectional view of the apparatus shown in FIG. 1.
Figure 3:
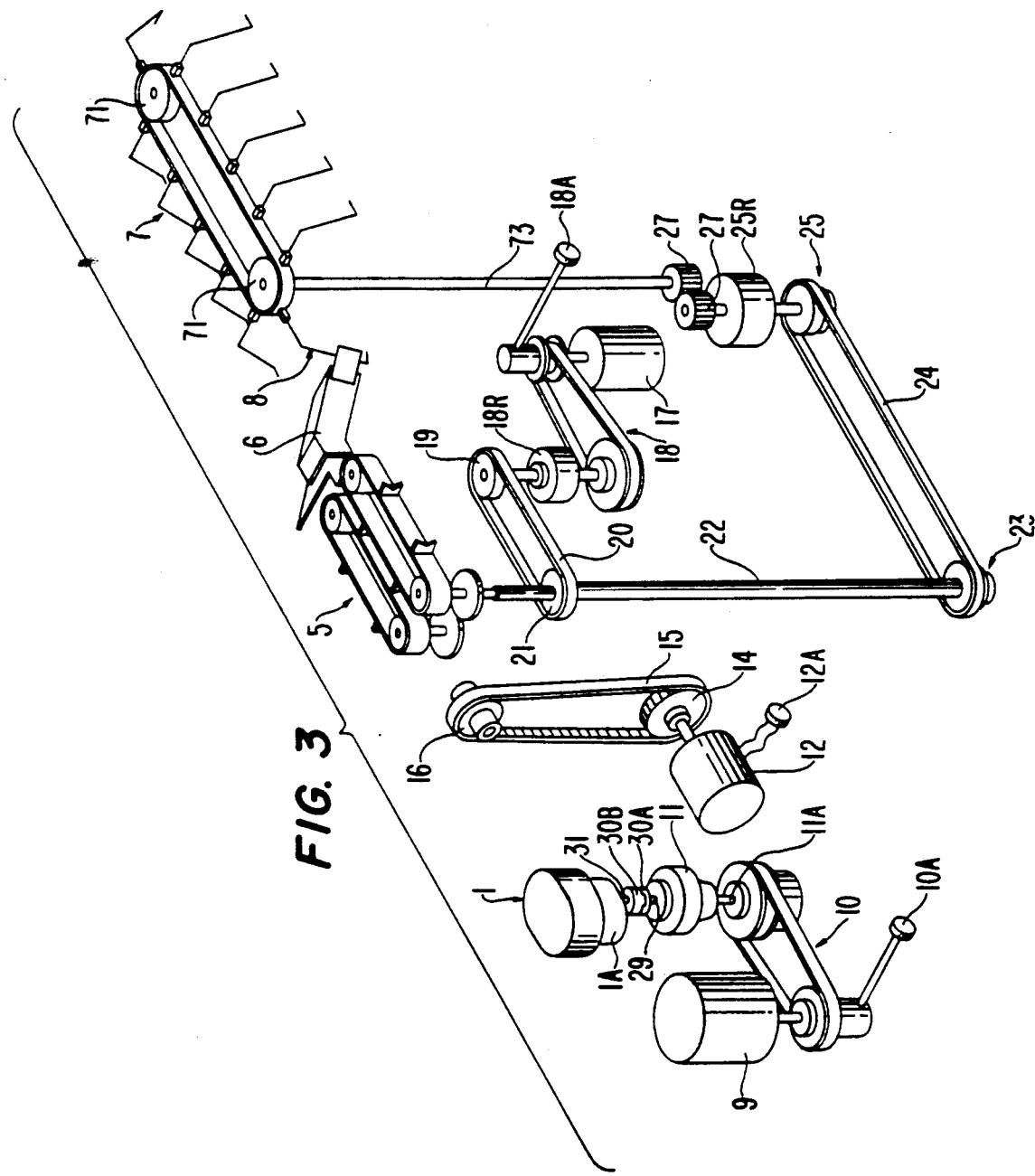
FIG. 3 is a perspective view mainly illustrating a rotation transmitting mechanism of the invention.

FIG. 1 is an overall perspective view of an apparatus for manufacturing sausages or the like in accordance with an embodiment of the present invention, FIG. 2 is a cross-sectional view of essential portions of the apparatus shown in FIG. 1, and FIG. 3 is a perspective view mainly illustrating a driving system shown in FIGS. 1 and 2.

Referring to the drawings, a pump 1 serves to charge a material such as a meat emulsion into a nozzle 2, and a casing supplying device 3 is adapted to accommodate casings (not shown in these drawings) that are stuffed with the material by means of the nozzle 2 and to supply the casings as required. A twisting device 4 is adapted to rotate the casing in cooperation with a linking device 5 to impart twists to the casing stuffed with the material. Reference numeral 6 denotes a so called looper for sequentially suspending an elongated chain of linked sausages or the like stuffed with the material on hooks 8 of a loop conveyor 7 into the form of loops in cooperation with the loop conveyor 7.

To give a more detailed description by mainly referring to FIGS. 2 and 3, the greatest feature of the present invention resides in that three motors are provided independently, and the rotative driving of the pump 1, the rotative driving of the twisting device 4, and the driving of the linking device 5 are effected separately.

In other words, a first motor 9 rotatively drives a speed reducer 11 via a belt-type speed changer 10, and the pump 1 is rotatively driven by the speed reducer 11. Incidentally, the details of the pump 1 will be described later. The speed change operation of the belt-type speed changer 10 is effected by means of a control knob 10A.

The rotating mechanism of the twisting device 4 is constructed as follows.

A second motor 12 constituted by a variable speed motor is secured to a frame 13 of the manufacturing apparatus, and a rotary member 16 accommodated in the twisting device 4 is rotatively driven by a belt 15 wound around a pulley 14 provided on the motor 12. The speed change operation of the variable speed motor 12 is effected by means of a control knob 12A. Although in this embodiment the belt 15 is a timing belt with teeth, but the type of the belt is not restricted. The rotary member 16 has a cylindrical member at its center, and a chuck 34 which will be described later is inserted and held in the cylindrical member.

A third motor 17 is adapted to drive the linking device 5 and the loop conveyor 7. The third motor 17 rotates a shaft 22 via a belt-type speed changer 18, a speed reducer 18R, a sprocket 19, a chain 20, and a sprocket 21. At the same time as the linking device 5 is rotatively driven by the shaft 22, the loop conveyor 7 is rotatively driven via a sprocket 23 provided on the shaft 22, a chain 24, a sprocket 25, a speed reducer 25R, and spur gears 27, 27. In this embodiment, the third motor 17, the belt-type speed changer 18, and the speed reducer 18R are integrated into a driving unit 35. The speed change of the speed changer 18 of the third motor 17 is effected by means of a control knob 18A.

A more detailed description will be given of the structure of each component part.

The structure of the pump 1 will first be described with reference to FIGS. 4 and 5 in addition to FIGS. 2 and 3. A mounting base 26 is secured to the frame 13 of the apparatus. The mounting base 26 is provided with a fitting hole 26B, and an engaging portion 1A suspended from a lower portion of the pump 1 is fitted with the fitting hole 26B. An output shaft 29 of the speed reducer 11 extends upward by passing through a bottom portion 26A of the mounting base 26, and the output shaft 29 is provided with a disk 30A having claws is provided on the output shaft 29. If the speed reducer 11 is formed into a compact structure in which a known speed reducer of an appropriate type with an input shaft 11A thereof arranged concentrically with the output shaft 29 is incorporated, the mounting and demounting of the speed reducer with respect to the mounting base 26 is facilitated. If a boss 11B fitting with the aforementioned through-hole of the mounting base 26 is formed on the speed reducer, the mounting and demounting is further facilitated. An input shaft 31 of the pump 1 extends downward by passing through the engaging portion 1A of the pump 1, and a disk 30B having claws is provided at a lower end of the input shaft 31. The claws of the disk 30A and the claws of the disk 30B constitute a coupling in which the disks 30A, 30B are fitted detachably when moved in the axial direction. If the engaging portion 1A of the pump 1 is fitted into the fitting hole 26B of the mounting base 26, these members engage each other, the axes of the output shaft 29 and the input shaft 31 are aligned with each other, and the disks 30A, 30B mesh with each other to prepare for the transmission of rotation.

Figure 4B:
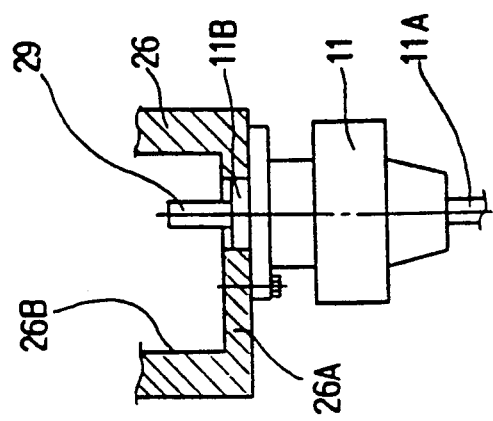
FIG. 4B is a partially cutaway cross-sectional view taken along the direction of the line B—B of FIG. 4A and illustrates a fitting hole in which the pump is inserted and the positioning of a reducing gear for the pump.
Figure 4A:
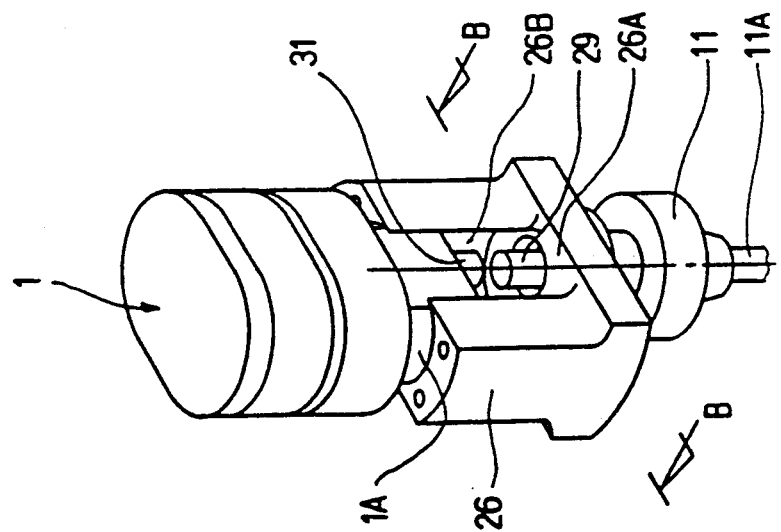
FIG. 4A is a perspective view explaining the mounting and demounting of a pump.
Figure 5:
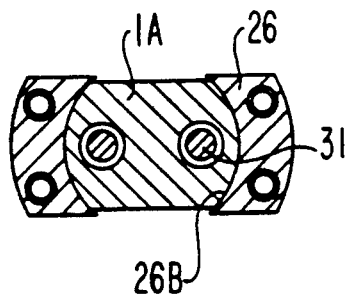
FIG. 5 is a cross-sectional view taken along the line V—V of FIG. 2 and illustrates a state of fitting between the pump and a base for mounting the pump.

FIGS. 4A and 4B are diagrams in which the disks 30A, 30B are removed.

Figure 6:
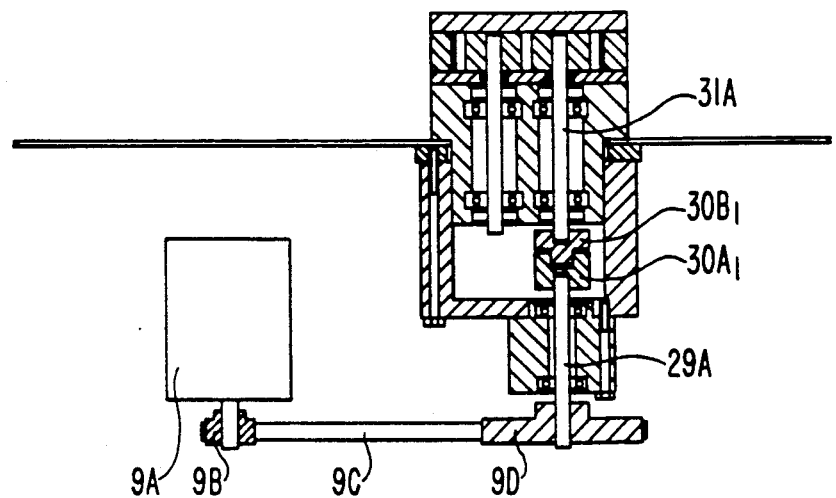
FIG. 6 is a cross-sectional view illustrating an example of a pump driving mechanism.

The driving of the pump 1 is effected by using the first motor 9, the speed changer 10, and the speed reducer 11. However, instead of the combination of the first motor 9, the speed changer 10, and the speed reducer 11, it is possible to employ a variable speed motor 9A, a pulley 9B, a belt 9C, a pulley 9D, an output shaft 29A, a disk $30A_1$ with claws, a disk $30B_1$ with claws, and an output shaft 31A for the pump, as shown in FIG. 6. The pulley 9D has a greater outside diameter than the pulley 9B, and the speed reducer is constituted by the aforementioned two pulleys and the belt.

Figure 7:
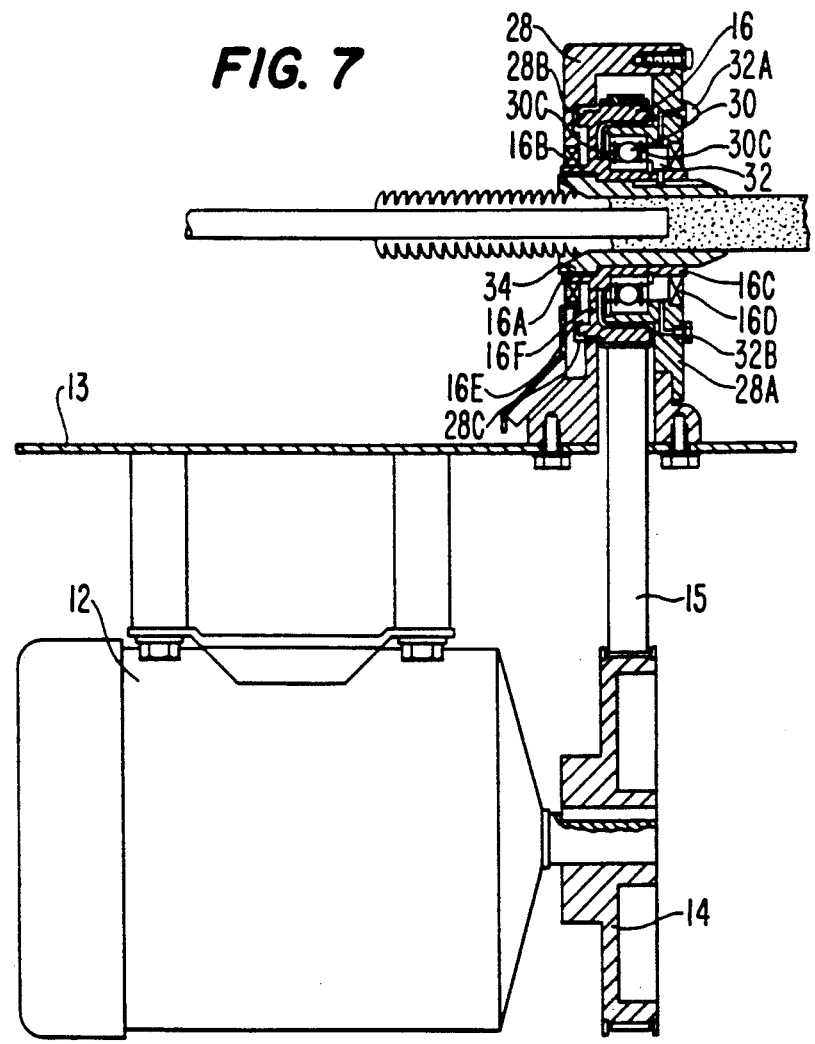
FIG. 7 is a cross-sectional view illustrating a mechanism for rotatively driving the chuck.

A description will now be given of the twisting device, i.e., a mechanism for rotatively driving the chuck, with reference to FIG. 7 in addition to FIGS. 2 and 3.

The characteristic of the mechanism for rotatively driving the chuck in this embodiment lies in that the driving mechanism is not mounted inside a conventional hermetically sealed housing filled in lubricating oil, but the rotary member 16 is mounted in a housing 28 which is open in the interior of the frame 13, the rotary member 16 is rotatively driven in a non-lubricated state by means of belt transmission, chain transmission, gear transmission, or the like, thereby allowing the bearing of the rotary member 16 to be lubricated separately. In the case of gear transmission, a combination of a metal and a resin is preferably adopted as the materials of the rotary member and a driving member for rotating the rotary member to assure operation in the non-lubricated state.

The housing 28 for accommodating the rotary member 16 therein is secured to the frame 13, and the housing 28 has its side open. After the rotary member 16 is accommodated in the housing 28 through that side, the side of the housing 28 is closed by a cap member 28A. The rotary member 16 is rotatably supported by a bearing 30 secured to the boss of the cap member 28A having the boss inserted in an annular groove of the rotary member. Since the widthwise central position of the bearing 30 is substantially aligned with the transverse center of the belt 15, the driving force transmitted by the belt acts substantially on the widthwise center of the bearing 30. As a result, the rotary member 16 rotating at high-speed can be supported by the sole bearing 30. It should be noted that the bearing 30 can be disposed on each side of the rotary member 16. The chuck 34 is inserted and held in the rotary member 16. A seal 16B is interposed between the housing 28 and one boss 16A of the rotary member 16, while a seal 16D is interposed between the cap member 28A and the other boss 16C of the rotary member 16. As a result, a foreign substance is prevented from entering the housing 28 on both sides thereof. A space 32 with lubricant, such as grease, sealed therein is provided adjacent to the bearing 30, and the lubricant is periodically replenished through an inlet port 32A having an filling passage and is discharged from a discharge port 32B having a discharge passage. At that time, the foreign substance which has entered through the seal 16D can also be discharged at the same time. A lubricant for the bearing 30 is sealed in between a pair of sealing members 30C disposed on opposite sides inside the bearing 30. It should be noted that the aforementioned sealing members 30C may be known oil seals that are disposed on the outer sides of the bearing 30. An annular groove portion 28B for accommodating the rotary member 16 is formed in an inner wall portion of a side surface of the housing 28, and an annular groove portion 16E of the rotary member 16 constitutes a discharge space inside the groove portion 28B. An opening portion 28C which is open in face-to-face relation with the groove portion 16E is provided in the groove portion 28B. The foreign substance, such as the material, which has entered the housing through the seal 16B is immediately discharged to outside the housing through the opening portion 28C via the discharge space. Accordingly, since a noncontact-type seal in which heat is not generated can be used for the seal 16B, the high-speed rotation of the rotary member 16 becomes possible. The opening portion 28C may be covered with a cover which is removed at the time of cleaning, and the foreign substance accumulated in the discharge space can be removed from the opening portion 28C during cleaning. The rotary member 16 has a fully closed disk portion 16F, and the bearing 30 is shielded from the foreign substance entering through the seal 16B by means of the disk portion 16F. Instead of the disk portion 16F, it is possible to provide a fixed plate inside the housing.

In accordance with the mechanism for rotatively driving the chuck 34, the mechanism is not affected by the foreign substance entering the housing, and maintenance including parts replacement and disassembly and reassembly therefor is facilitated as compared with the conventional arrangement in which lubricating oil is filled in the hermetically sealed housing and gears and a bearing are disposed therein. Namely, at the time of parts replacement, if the cap member 28A is removed, the rotary member 16, the bearing 30, and the seal 16D can be removed out of the housing 28, so that the replacement operation can be carried out simply.

Figure 8A:
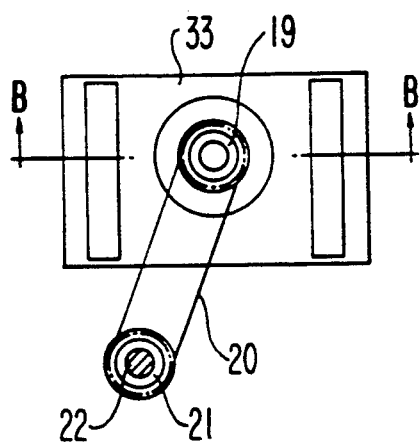
FIG. 8A is a cross-sectional view taking in the direction of arrow VIIIA of FIG. 2 and illustrates a portion for mounting a driving unit for a linking device.
Figure 8B:
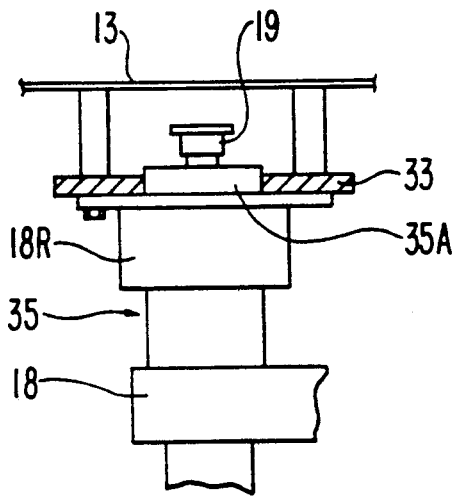
FIG. 8B is a partially cutaway cross-sectional view taken along the line B—B of FIG. 8A.

A description will now be given of the driving mechanism of the linking device 5 with reference to FIG. 8 in addition to FIGS. 2 and 3. The feature of this embodiment lies in that the shaft for driving the linking device is not pivotally supported by the hermetically sealed housing of the twisting device as with the conventional apparatus, but the shaft 22 is pivotally supported by an upper bearing 22A and a lower bearing 22B disposed separately from the open-type housing 28 of the twisting device 4, and the shaft 22 is rotatively driven by a driving unit 35 in which the motor 17, the belt-type speed changer 18, and the speed reducer 18R are integrally arranged.

A flange 22C for the upper bearing 22A is detachably fixed to the frame 13, and the lower bearing 22B is similarly fixed to a front surface portion of the frame 13. Also fixed to the frame 13 is a mounting base 33 having a through-hole in which a boss 35A formed on the aforementioned driving unit 35 is fitted. The driving unit 35 is secured to the mounting base 33 by means of unillustrated bolts.

With the above-described driving mechanism of the linking device 5, since the bearing 22A is provided separately from the housing 28 of the twisting device 4, the replacement of the bearing 22A can be conducted readily by removing the flange 22C. Since the shaft 22 is driven by the driving unit 35, at the time of replacing the parts of the driving mechanism of the linking device, such waste as the need to remove the parts of other mechanisms as in the case of the conventional apparatus can be dispensed with, and the replacement of the driving unit can be effected within a short time.

Referring now to FIGS. 9A to 16, a description will be given of the details of the looper 6 and the loop conveyor 7.

First, a description will be given of an embodiment shown in FIGS. 9A to 13.

Figure 9A:
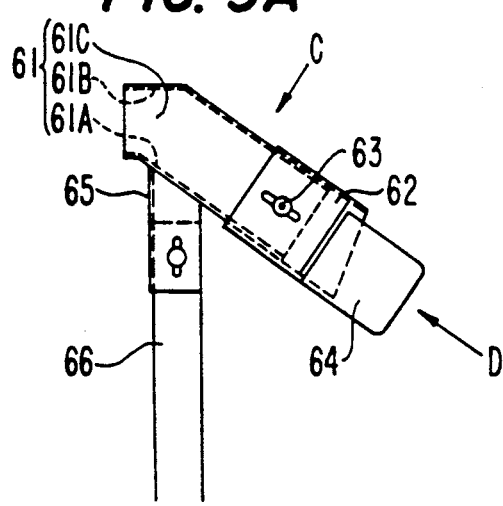
FIG. 9A a front elevational view of a looper.
Figure 9B:
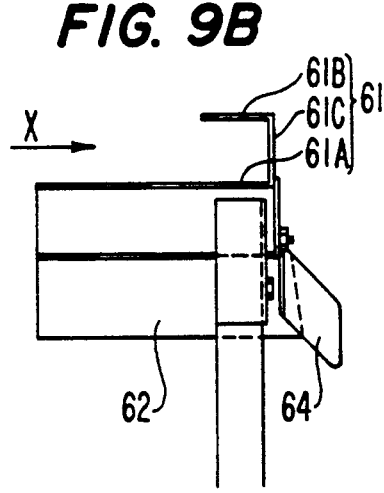
FIG. 9B is a side elevational view of the looper shown in FIG. 9A.
Figure 9C:
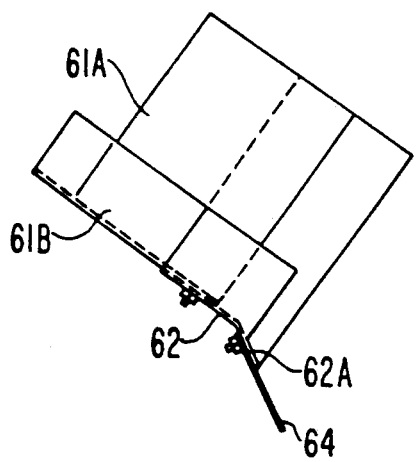
FIG. 9C is a view taken in the direction of arrow C in FIG. 9A.
Figure 9D:
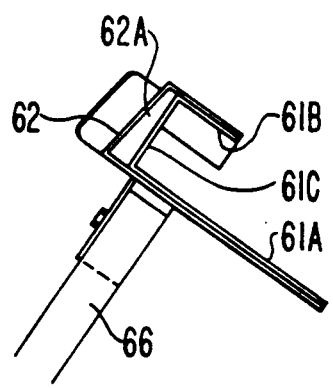
FIG. 9D is a view taken in the direction of arrow D in FIG. 9A.
Figure 10:
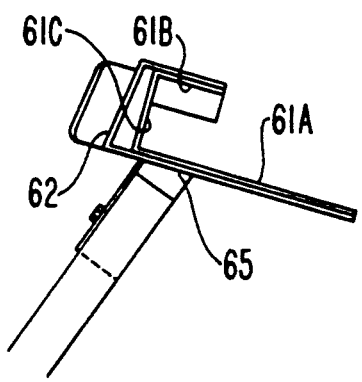
FIG. 10 is a diagram illustrating another embodiment of the looper.

The looper 6 is disposed in such a manner as to oppose an outlet portion (the right-hand side in FIG. 1, for example) of the linking device 5. The looper 6 is designed to receive a chain of products flowing out from the linking device 5 and arrange its flow into a substantially fixed form of passage, so as to introduce the chain of products to a position of retention by a hook, which will be described later. As illustrated in detail in FIGS. 9A to 9D and FIG. 13 (a perspective view of the looper 6 taken in the direction of arrow X in FIG. 9B), the looper 6 is inclined downward in the direction of the flow of the chain of products, and has a configuration in which one side of it is open. A body 61 of the looper 6 comprises a bottom portion 61A serving as a wide guide surface extending in a horizontal direction perpendicular to the path of the chain of products, a top plate portion 61B opposed thereto, and a side portion 61C connecting the two members, in such a manner as to cover the path of the chain of products in three directions. Thus the body 61 has a configuration in which it has openings in the longitudinal direction of the path and is open on one side thereof. It should be noted that the bottom portion 61A may be arranged to extend horizontally in a cross section perpendicular to the path, as shown in FIG. 9D, or incline downward toward the side portion 61C, as shown in FIG. 10. An extension member 62 having a substantially identical cross-sectional configuration to the body 61 is provided in a downstream portion of the body 61 in such a manner as to permit a change in the position in the direction of the path by means of a screw 63. A resilient member 64 is attached to the extension member 62.

As for the looper 6, a supporting portion 65 of the looper 6 is mounted on a mounting column 66 of the frame so that the chain of products from the linking device 5 can be received at an optimum position.

The loop conveyor 7 is disposed at a downstream position of the looper 6, as shown in FIG. 1. The hooks 8 of the loop conveyor 7 are disposed in such a manner as to move in a plane intersecting the path of the chain of products and including a horizontal component, i.e., in a horizontal plane or a plane inclined therefrom. The loop conveyor 7 has a chain 72 trained between two sprockets 71, 71 at spaced positions and adapted to travel substantially in a horizontal plane as indicated by the arrow. A plurality of the hooks 8 projecting outwardly are fixed to the chain 72 at spaced intervals. Each of the hooks 8 comprises a horizontal proximal fixing portion 8A, an intermediate portion 8B inclined downward therefrom, and a distal end portion 8C extending upward from the intermediate portion 8B and oriented forwardly in the direction of its travel. Thus the intermediate portion 8B and the distal end portion 8C form a V-shaped configuration.

Referring to FIG. 3, the loop conveyor 7 having the above-described construction is operated as one of the sprockets 71 receives a driving force from the motor 17. That is, the operation of the loop conveyor 7 is effected as the spur gear 27 fixed to the output shaft of the speed reducer 25R driven by the chain 24 trained between the multi-stage sprockets 23, 25 meshes with the spur gear 27 provided on a shaft 73 for driving the aforementioned sprocket 71. Without resorting to the aforementioned means, the driving of the loop conveyor 7 may be effected by, for instance, providing a motor exclusively used for the loop conveyor and driving the motor by a known detecting and controlling means, as desired.

A description will be given hereinunder of the operation of the apparatus of this embodiment constructed as described above. FIG. 11 is a top plan view of an essential portion sectioned at the side portion 61C of the looper with the top plate portion 61B removed. FIG. 12 is a side-elevational view.

(1) First, in FIG. 11, the chain of products L being fed in the direction of arrow A by the linking device 5 tends to move straightly forward while maintaining its path B and drops into a free space while being guided by the bottom portion 61A of the looper 6.

(2) The intermediate portion 8B of the hook 8 which has rotatingly moved in the direction of arrow C engages a linked portion (constricted portion) L1 of the chain of products L at a forward position in the direction of movement of the hook relative to the aforementioned path B. There are also cases where the linked portion is retained not at the intermediate portion of the hook 8 but at the V-shaped portion of the hook 8.

(3) Upon receiving contact pressure exerted by the extension body 62 and the hook 8 due to retention by the intermediate portion 8B of the hook 8, the flow of the chain of products in the falling direction is stopped at the retained portion, with the result that the portion of the chain of products located on the bottom portion 61A of the looper between the linking device 5 and the retained portion undergoes a change in its form of flow by curving in the opposite direction to the traveling direction of the hook, as shown in FIG. 11.

The resilient member 64 serves to continue to press the link placed on the hook further against the hook, which renders the change in the aforementioned form of flow, i.e., the form of passage, more positive.

(4) The portion of the chain of products curved as described above grows large with progress in the supply of the chain of products, and then slides down from the looper and is suspended from the V-shaped portion of the moving hook 8.

(5) After the hook 8 passes through an area downstream of the looper 6, the chain of products returns to its original rectilinear path owing to its inertia and the like, and assumes the state described is step (1) above.

(6) Thus, by repeating the cycle of the aforementioned steps (1) to (5) with respect to ensuing hooks, the chain of products is suspended by the loop conveyor 7 into the form of loops, and after suspension is completed for the entire one chain of products, the looped products are moved onto the smoking stick or the like so as to prepare for an ensuing process such as heat treatment.

In this embodiment, the distance between the extension member 62 of the looper 6 and the intermediate portion 8B of the hook 8 or the retaining portion of the hook can be altered. As for the aforementioned change in the form of passage, if the links are short, the linked portions (constricted portions) connecting the links are positioned on the curved path, as shown in FIG. 13. In the case of the chain of linked products having a long length wherein one link has substantially the same length as the looper, one link itself becomes curved or bent, thereby undergoing a change in the form of passage. This change in the form need not be effected with the chain of products being constantly brought into contact with the bottom portion 61A of the looper, and the deformed portion of the chain of products may float upward by being separated from the bottom portion insofar as it has a component of force acting in the opposite direction to the traveling direction of the hook.

A looper in accordance with another embodiment is shown in FIG. 14. FIG. 14 is a perspective view taken in the same direction as that of the FIG. 13. A looper 68 of this embodiment is used by substituting the looper 6 of the apparatus of the embodiment shown in FIGS. 9A to 13. Although the looper 68 of this embodiment is similar to that of the aforementioned embodiment in that the path of the chain of products is covered on three sides, but a bottom portion 68A has a narrower width toward the downstream side, and a side bottom portion 68C is inclined upwardly. The intermediate portion 8B of the hook 8 is adapted to pass in a range defined between an extension of the bottom portion 68A and an extension of the top plate portion 68B.

With the apparatus of this embodiment constructed as described above, when the form of the passing chain of products is curved and deformed, its central portion hangs down from a side edge 68A', i.e., a ridge of the side bottom portion 68C, thereby accelerating the change in the form. Then, after the chain of products is suspended on the hook, the chain of products, whose hanging length has increased in conjunction with an increase in the volume of the chain of products being supplied from the linking device 5, is guided by the side edge 68A in conjunction with the movement of the hook 8 and flows out downstream of the looper 68, and then the chain of products in the looper 68 returns to its form persisting prior to the change in the form.

Figure 15A:
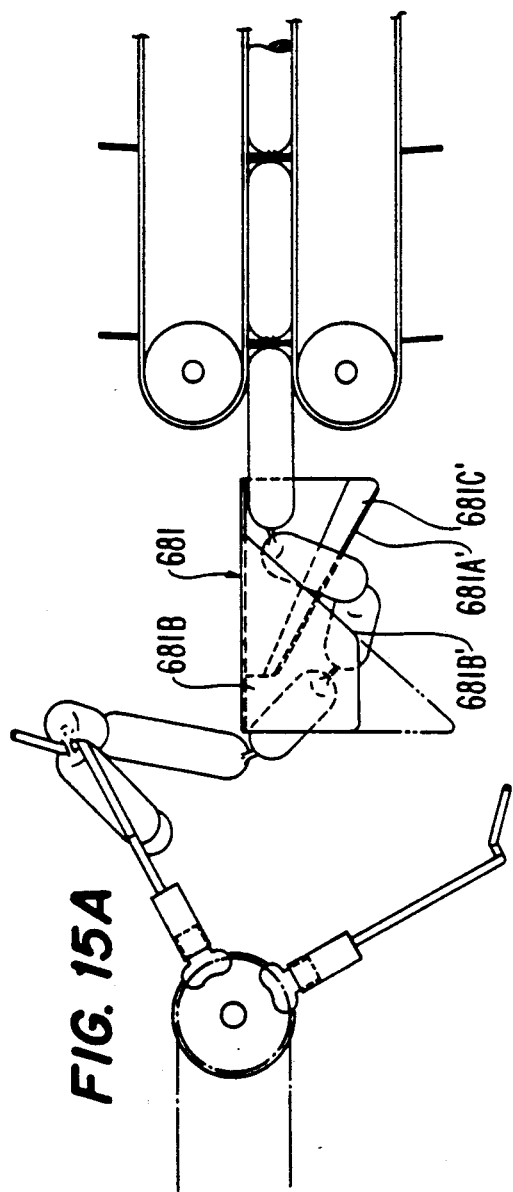
FIGS. 15A and 15B are a top plan view and a front elevational view of still another looper having an improved configuration over that of FIG. 14, respectively.
Figure 15B:
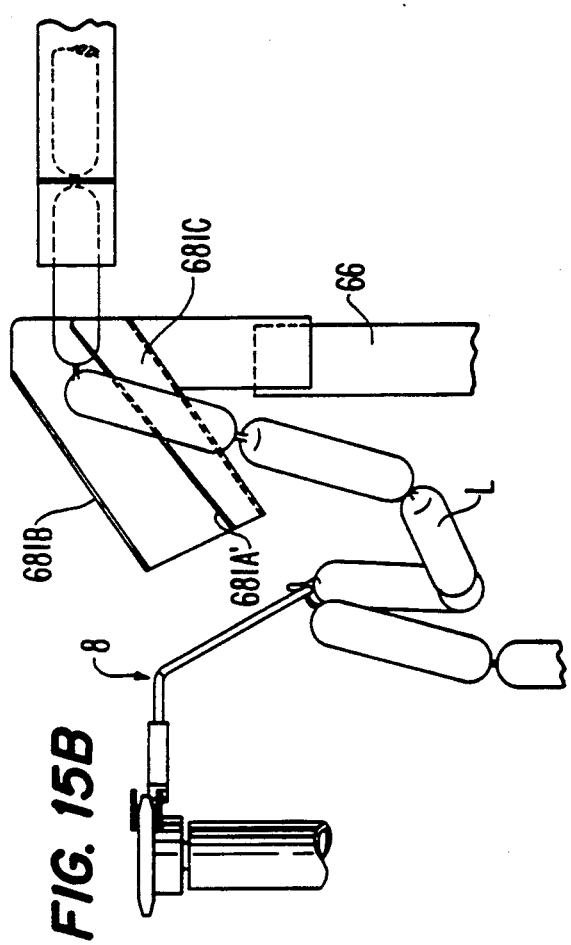

Furthermore, a preferred form of still another embodiment is shown in FIGS. 15A and 15B. In this example, a looper 681 has an inclined ridge formed in such a manner that a side edge 681A' of a side bottom portion 681C intersects a side edge 681B' of a top plate portion 681B when viewed from the top, as shown in FIG. 15A. That is, when the chain of products which has been sent to the looper 681 is brought into contact with the top plate portion 681B, the chain of products hangs down positively from the side edge 681A' of the side bottom portion 681C, as shown in FIG. 15B. Subsequently, the chain of products slides downstream along the side edge 681A' and returns to the initial path for supplying.

If the above-described form is adopted, even if the length of each link of the chain of products is relatively long, and the chain of products is liable to be jammed at the top plate portion, if provided, the chain of products readily undergoes a change in its form temporarily in the upward direction in the open space upstream of the side edge 681B' without any jamming. The chain of products then undergoes a change in its form toward the side edge 681A while moving along the aforementioned inclined side edge 681B', and subsequently hangs down from the side edge 681A'.

In addition, in cases where the length of each link of the chain of products is relatively long and the passing speed thereof is high, the chain of products in terms of the change in its form jumps out laterally by a relatively large distance, so that it is effective to form a downstream portion of the top plate portion 681B in a projecting manner, as indicated by the two-dotted dash line in FIG. 15A. The top plate portion thus formed in a projecting manner as indicated by the two-dotted dash line may be inclined downward as in the case of a wing portion in accordance with a further embodiment which will be described below.

A description will now be given of a further embodiment of the present invention with reference to FIGS. 16A and 16B. In this embodiment, there is provided a looper 69 which is more suitable for a chain of products having a longer link length and a larger diameter as compared with the foregoing embodiments. The looper 69 of this embodiment is characterized in that, in contract to the top plate portion shown in FIGS. 15A and 15B, there is provided a wing portion 69C extending in a downwardly inclining manner with respect to a top plate portion 69B.

Furthermore, in order to allow smooth passage of the chain of products which is large in both diameter and length, the looper 69 of this embodiment is preferably provided with a configuration in which a horizontal section I disposed downstream of the linking device is provided on the linking device 5 side, a bend is provided midway, and an downwardly inclined section II is provided in a downstream portion, as shown in FIG. 15B. As for the manner of this bending, it may be bent as illustrated or may be such as to be curved in a continuous manner, although not illustrated. In the case of a chain of products having a large outside diameter and a large link length, the links are difficult to deform. In this embodiment arranged as described above, even in the case of the chain of products which is difficult to deform and tends to deviate laterally by a large distance in terms of its form of flow by being retained by the hook, the chain of products is subjected to a restricting force by the wing portion 69C in such a manner that the amount of deviation remains within a predetermined range allowing the chain of products to be retained by an ensuing hook 8. Consequently, the form of passage of the chain of products changes positively in a downward direction, and it moves speedily along the side edge 69' and returns to the initial path of the chain of products.

With respect to the embodiments concerning the aforementioned three loopers and the loop conveyor, the operation thereof will be described in greater detail.

It is preferred that the looper exert braking action upon a chain of products, depending on their link length. Generally speaking, products with a short link length are difficult to be retained by the hook, while products with a long link length are retained easily. Therefore, if products of long link lengths are to be suspended, braking by the looper is not required. For instance, in the case of a chain of products formed with links of 3 to 6 cm or thereabouts, if an interval between a downstream end portion of the looper and a position of retention by the hook is set to be shorter than the link length, the hook which has been brought into contact with a desired linker portion passing through the retaining position presses the link between the same and the downstream end portion of the looper, thereby braking the flow.

In accordance with the above-described system of the invention for individually driving the pump, the chuck, and the linking device, with respect to the pump 1, only the rotation of the pump 1 can be independently subjected to stepless speed change by operating the control knob 10A of the transmission 10. In addition, the rotation of the chuck 34 can also be independently subjected to stepless speed change by operating the control knob 12A of the variable speed motor 12. Furthermore, the speed of the linking device 5 can also be independently subjected to stepless speed change without being affected by the rotation of the pump 1 and the chuck 34. In accordance with the present invention comprising the above-described system for individually driving the pump, the chuck, and the linking device and the system for forming loops by means of the fixed-type looper and the loop conveyor, since the looper does not undergo any movement, the chains of products discharged from the linking device, which supply the chains of products of various sizes at various speeds, are not only capable of passing smoothly through the looper, but are also formed into loops securely without any disorder in the timing at which they are retained by the hooks.

The preferred embodiments described herein are illustrative and not restrictive, and it will be appreciated from the foregoing description that various modifications are possible without departing from the spirit and scope of the invention.

The advantages of the apparatus of the present invention which is constructed and operates as described above are as follows.

Since the number of revolutions of the chuck can be altered continuously to an optimum value irrespective of the speed of the linking device, parts replacement which has hitherto been time-consuming and troublesome can be dispensed with, and an optimum number of twists, which has not been possible to obtain through the conventional parts replacement alone, can be obtained easily and positively. In addition, if a change in the rotation of the pump and a change in the rotation of the linking device are also effected, it is possible to increase productivity to a maximum under optimum operating conditions at the time of a change in the product size.

Since a minimum number of twists required can always be imparted to linked portions of a chain of products, irrespective of changes in the product size overtwisting does not occur, and the overuse of the casing due to overtwisting is obviated, so that it is economical.

Changes of all the operating conditions can be effected by simply rotating the control knobs, and parts replacement which has hitherto been practiced is not required, so that the operational control is made easy.

The respective component parts are made into units, assembling efficiency and reproducibility are improved, the replacement of units is made easy, assembly is effected with high precision, and interchangeability is high.

Since the rotary member for holding the chuck is not accommodated in a hermetically sealed housing, it is the case with the prior art, but is accommodated in the interior of an open-type housing. The bearing for supporting the rotary member is also provided in the interior of the open housing. Accordingly, at the time of replacing parts of the housing interior, the replacement work can be effected simply by removing the cap member without needing to remove the housing.

With the apparatus in which the connection between the output shaft of the speed reducer for rotatively driving the pump and the input shaft of the pump is effected by a coupling which is fitted detachably in the axial direction, and in which the engaging portion of the pump is fitted in a fitting hole of the pump mounting base, the mounting and demounting of the pump can be conducted quite simply with a highly accurate state of interchangeability.

With the apparatus comprising the fixed looper end and the loop conveyor having hooks moving in a plane including a horizontal component in addition to the arrangement permitting changes in the rotation of the pump, the chuck, and the linking device to be carried out continuously and independently of each other, it is possible to obtain a system of a manufacturing apparatus for stuffing, linking, and looping sausages or the like that functions stably with respect to changes in the product size and changes in the operating speed. In other words, since the looper has a space allowing a change in the form of the chain of products attributable to retention by the hook, a constantly stable change in the form occurs, with the result the chain of products is not jammed in the looper, and is prevented from slipping down from the hook. Therefore, chains of sausages of varying sizes ranging from a short link length to a long link length can be suspended stably at speeds ranging from high speed to low speed.

With the apparatus provided with the above-described loop forming device, the arrangement is simple, the number of parts subject to maintenance is small, and maintenance is therefore facilitated. In addition, it is possible to obtain a system of a manufacturing apparatus for stuffing, linking, and looping sausages or the like which facilitates adjustment at the time of a change in the produce size.

What is claimed is:

1. An apparatus for manufacturing sausages or the like comprising: a nozzle for stuffing a material such as a meat emulsion into a casing for sausages or the like; a pump for supplying the material into said nozzle; a chuck for rotating the casing stuffed with the material by said nozzle; and a linking device for clamping the stuffed casing discharged from said chuck and forming the casing stuffed with the material into the form of a chain in cooperation with said chuck,
    wherein a motor for driving said pump, a motor for driving said chuck, and a motor for driving said linking device are provided separately and independently of each other, and the respective numbers of revolutions of said pump, said chuck, and said linking device driven by respective said motors are individually changeable.

2. An apparatus for manufacturing sausages or the like according to claim 1, further comprising a looper disposed between a linking device and a loop conveyor and adapted to receive a chain of linked products, said loop conveyor having hooks moving in a plane including a horizontal component, and said looper having a space for rendering a form of passage of the chain of linked products in said looper changeable in such a manner that the chain of linked products is retained by one of said hooks of said loop conveyor.

3. An apparatus for manufacturing sausages or the like according to claim 1, further comprising a device for driving said chuck, said device including a housing, a rotary member which is rotatably accommodated inside said housing and in which said chuck is inserted and fixed so as to rotate said chuck, a bearing for rotatably supporting said rotary member, sealing means for preventing the entrance of a foreign substance such as the material into said bearing, a sealing member for sealing a lubricant for said bearing in said bearing, and rotation transmitting means for rotatively driving said rotary member.

4. An apparatus for manufacturing sausages or the like according to claim 1, wherein a mounting base for positioning said pump is secured to a frame, a fitting hole is formed in said mounting base, an engaging portion is provided on said pump, said engaging portion of said pump is fitted in said fitting hole, and a coupling is provided between a shaft of said pump extending from said engaging portion of said pump to a driving side and a shaft of a speed reducer for said pump extending to a pump side by passing through said mounting base.

5. An apparatus for manufacturing sausages or the like according to claim 1, wherein said motor for driving said linking device, a speed changer, and a speed reducer are provided detachably on a frame as a unit.

6. An apparatus for manufacturing sausages or the like according to claim 1, further comprising a device for driving said chuck, said device including a housing, a rotary member which is rotatably accommodated inside said housing and in which said chuck is inserted and fixed so as to rotate said chuck, a bearing for rotatably supporting said rotary member, sealing means for preventing the entrance of a foreign substance such as the material into said bearing, a sealing member for sealing a lubricant for said bearing in said bearing, and rotation transmitting means for rotatively driving said rotary member,
    wherein a mounting base for positioning said pump is secured to a frame, a fitting hole is formed in said mounting base, an engaging portion is provided on said pump, said engaging portion of said pump is fitted in said fitting hole, and a coupling is provided between a shaft of said pump extending from said engaging portion of said pump to a driving side and a shaft of a speed reducer for said pump extending to a pump side by passing through said mounting base,
    wherein said motor for driving said linking device and a loop conveyor, a speed changer, and a speed reducer are provided detachably on a frame as a unit, and
    wherein a looper is disposed between said linking device and said loop conveyor and adapted to receive a chain of linked products, said loop conveyor having hooks moving horizontally, said linking device and said loop conveyor being driven by the same motor, and said looper having a space for rendering a form of passage of the chain of linked products in said looper changeable in such a manner that the chain of linked products is retained by one of said hooks of said loop conveyor.

* * * * *

UNITED STATES PATENT AND TRADEMARK OFFICE
CERTIFICATE OF CORRECTION

PATENT NO. : 5,092,813

DATED : March 3, 1992

INVENTOR(S) : Minoru SASAI et al.

It is certified that error appears in the above-identified patent and that said Letters Patent is hereby corrected as shown below:

Cover page, line [73] Assignee:, delete "Hitec Co., Ltd." and insert -- HITEC Co., Ltd. --.

Fig. 15A, delete "681C' " and insert -- 681C --.

Column 1, line 15, delete "Wieners" and insert -- weiners --.

Column 1, line 54, after "5899/1966" and before "(U.S. Pat. No. 3,191,222)" delete -- , -- and then insert -- , -- after "(U.S. Pat. No. 3,191,222)".

Column 2, line 38, after "No. 5899/1966" and before ", the pump" insert -- (U.S. Pat. No. 3,191,222) --.

Column 2, line 42, delete "(U.S. Pat. No. 3,191,222)" and insert -- (U.S. Pat. No. 4,539,796) --.

Column 2, line 55, delete "No. 4,539,796)" and insert -- No. 3,191,222) --.

Column 10, line 44, delete "68A" and insert -- 68A' --.

Column 11, line 67, delete "linker" and insert -- linked --.

Column 12, line 50, after "product size" and before "overt-" insert -- , --.

Column 12, line 63, delete "it" and insert -- as --.

Column 13, line 12, after "looper" delete -- end --.

UNITED STATES PATENT AND TRADEMARK OFFICE
CERTIFICATE OF CORRECTION

PATENT NO. : 5,092,813

DATED : March 3, 1992

INVENTOR(S) : Minoru Sasai, et al

It is certified that error appears in the above-identified patent and that said Letters Patent is hereby corrected as shown below:

Column 13, line 60, delete "a linking device" and insert
--said linking device--.

Signed and Sealed this

Twenty-first Day of September, 1993

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,092,813

DATED : March 3, 1992

INVENTOR(S) : Minoru KASAI et al.

It is certified that error appears in the above-identified patent and that said Letters Patent is hereby corrected as shown below:

Column 1, line 15, delete "Wieners" and insert -- wieners --.

Signed and Sealed this

Fifth Day of October, 1993

Attest:

BRUCE LEHMAN

Attesting Officer

Commissioner of Patents and Trademarks